United States Patent
Eastham et al.

[11] Patent Number: 6,045,929
[45] Date of Patent: Apr. 4, 2000

[54] COMPOSITE SLIDING CONTACT BEARING

[75] Inventors: David Raymond Eastham, Hemel Hempstead; Charan Preet Singh Johal, Birstall, both of United Kingdom

[73] Assignee: T&N Technology Limited, Rugby, United Kingdom

[21] Appl. No.: 09/140,475

[22] Filed: Aug. 27, 1998

Related U.S. Application Data

[63] Continuation of application No. 08/836,450, filed as application No. PCT/GB95/02582, Nov. 13, 1995, Pat. No. 5,925,471.

[30] Foreign Application Priority Data

Nov. 10, 1994 [GB] United Kingdom .................... 9422652

[51] Int. Cl.⁷ ........................... B32B 15/10; B32B 15/00; B32B 15/20; F16C 17/00; F16C 33/00
[52] U.S. Cl. ........................ 428/650; 428/652; 428/653; 428/658; 428/674; 428/908.8; 384/26; 384/42; 384/912
[58] Field of Search ..................................... 428/650, 653, 428/658, 674, 677, 908.8, 652; 384/26, 42, 912; 420/518, 520, 522

[56] References Cited

U.S. PATENT DOCUMENTS

| | | | |
|---|---|---|---|
| 4,285,995 | 8/1981 | Gomersall | 427/383.9 |
| 4,696,867 | 9/1987 | Eastwood | 428/650 |
| 4,836,695 | 6/1989 | Baureis et al. | 384/276 |
| 4,853,295 | 8/1989 | Shindo et al. | 428/621 |
| 4,877,696 | 10/1989 | Muto | 428/645 |
| 4,973,523 | 11/1990 | Neuhaus et al. | 428/653 |

FOREIGN PATENT DOCUMENTS

| | | |
|---|---|---|
| 980565 | 1/1965 | United Kingdom . |
| 1577059 | 10/1980 | United Kingdom . |
| 2285839 | 7/1995 | United Kingdom . |

*Primary Examiner*—Paul Thibodeau
*Assistant Examiner*—Holly C. Rickman
*Attorney, Agent, or Firm*—Synnestvedt & Lechner LLP

[57] ABSTRACT

A plain bearing having a metal backing, a bearing lining secured to the backing and an overlay plated to an interlayer, which is itself plated onto the bearing lining, is disclosed. The bearing lining is formed from an alloy based on aluminum or copper. The overlay is formed of an alloy of zinc with 0.5 to 25% by weight of a metal selected from nickel, cobalt and iron, and the material of the interlayer is selected from nickel and copper.

7 Claims, No Drawings

COMPOSITE SLIDING CONTACT BEARING

RELATED APPLICATION

This is a continuation of U.S. application Ser. No. 08/836,450, filed May 12, 1997, now U.S. Pat. No. 3,925,471, which is based on PCT/GB95/02582, filed Nov. 13, 1995, which claims priority of GB 9422652.9, filed Nov. 10, 1994.

This invention is concerned with plain bearings, eg for use in the crankshaft system of an internal combustion engine.

One type of plain bearing which is in current use comprises a bearing lining bonded to a steel backing and a thin overlay on the working surface of the lining. The bearing lining is formed from an alloy based on aluminum or copper and the overlay is typically an alloy of lead, tin and copper or an alloy of lead, tin and indium. The overlay provides compliant properties which are required for effective operation, eg conformability, compatibility with the shaft material which runs on the bearing, and dirt embeddability, which properties are generally lacking in the lining alloy. "Conformability" is the term used to describe the ability of the bearing lining to accept small misalignments between the bearing and the rotating member, and "compatibility" is the ability to resist local welding between the bearing lining and the rotating member in regions of asperity contact.

Because the overlay materials are difficult to plate directly on to an aluminum-based lining alloy and because diffusion may occur with a copper-based lining alloy, it is common practice to apply a thin interlayer (1 to 3 microns in thickness) to the bearing lining and to plate the overlay on to the interlayer. In the case of an aluminum-based lining alloy, the interlayer is nickel or a copper alloy and, in the case of a copper-based lining alloy, the interlayer is nickel. Conventional overlay materials have adequate wear resistance for many circumstances but, in some cases, the interlayer or the lining alloy is exposed in a relatively short time. Thus, there is a requirement for bearings with overlays with greater wear resistance. Furthermore, as the use of lead is environmentally undesirable, there is a requirement for bearings with overlays which do not contain lead.

It is an object of the present invention to provide a plain bearing having an overlay which has increased wear resistance and does not contain lead.

The invention provides a plain bearing comprising a metal backing, a bearing lining secured to the backing, the bearing lining being formed from an alloy based on aluminum or on copper, and an overlay on the working surface of the lining, characterised in that the overlay comprises an alloy of zinc with 0.5 to 25% by weight of at least one metal selected from nickel, cobalt and iron.

A plain bearing according to the invention has an overlay which is lead-free and is found to have greater wear resistance than conventional overlays formed from a combination of lead, tin and copper or from a combination of lead, tin and indium. Furthermore, a bearing with such an overlay has a high temperature capability (above 250° C.).

The overlay alloy may contain two or more of the metals nickel, cobalt and iron and may have a second phase dispersed therein. The second phase may comprise hard non-metallic material, such as silica, alumina or silicon nitride, or may comprise soft friction-reducing material, such as PTFE or graphite.

The overlay may be plated directly on to the lining alloy, or an interlayer may be plated on to the lining alloy and the overlay be plated on to the interlayer. The interlayer may be nickel or a copper alloy.

Where the overlay is an alloy of zinc and nickel, the nickel may be present in 5 to 15% by weight.

Where the overlay is an alloy of zinc and cobalt, the cobalt may be present in 2 to 12% by weight.

Where the overlay is an alloy of zinc and iron, the iron may be present in 5 to 15% by weight.

The overlay may be up to 50 microns in thickness, preferably 10 to 25 microns.

There now follows an example which is illustrative of the invention.

In the illustrative example, plain bearings in the form of half-shells were manufactured. Firstly, conventional aluminum-tin alloy linings were applied to conventional steel backings. Next, the exposed surface of the linings were given a zincate treatment to improve adhesion between the layers and metals plated thereon. The half plain bearings were now divided into two batches.

One of the batches was now electroplated in a conventional manner with a nickel interlayer about 3 microns in thickness, the nickel being plated directly on to the lining alloy.

Finally, the both batches were electro-plated in conventional manner with an overlay which was directly plated on to the interlayer or, in the case of the batch without an interlayer, directly on to the lining alloy so that the overlay formed the working surface of the bearing. The overlay comprised an alloy of zinc and nickel, the nickel being present as 11% by weight.

A control batch of plain bearings was then prepared in identical manner to the batch of the illustrative example which had an interlayer except that the overlay was of conventional material. In the case of the control batch, the overlay was a combination of lead, tin (12% by weight), and copper (2.5% by weight).

Plain bearings from all three batches were subjected to a wear test and the thickness loss of the overlay was measured at the conclusion of the test. The control batch showed an average loss of 17.5 microns. The batch from the illustrative example without an interlayer showed an average loss of 15.3 microns, and the batch from the illustrative example with an interlayer showed an average loss of 5.9 microns. These results indicated that the overlay according to the invention had greatly increased wear resistance. The presence of an interlayer is beneficial to the wear resistance but the overlay according to the invention allows the interlayer to be dispensed with and superior wear resistance to still be achieved.

What is claimed is:

1. A plain bearing comprising a metal backing, a bearing lining secured to the backing, the bearing lining being formed from an alloy based on aluminum or on copper, and an overlay on the working surface of the lining, wherein the overlay comprises an alloy of zinc with 0.5 to 25% by weight of at least one metal selected from the group consisting of nickel, cobalt and iron and the overlay being lead-free and plated directly on to the lining alloy.

2. A plain bearing according to claim 1, wherein the overlay alloy comprises two or more of the metals nickel, cobalt and iron.

3. A plain bearing according to claim 1, wherein the overlay alloy has a second phase dispersed therein.

4. A plain bearing according to claim 1, wherein the overlay is an alloy of zinc and nickel with the nickel present in an amount of 5 to 15% by weight.

5. A plain bearing according to claim 1, wherein the overlay is an alloy of zinc and cobalt with the cobalt present in an amount of 2 to 12% by weight.

6. A plain bearing according to claim 1, wherein the overlay is an alloy of zinc and iron with the iron present in an amount of 5 to 15% by weight.

7. A plain bearing according to claim 1, wherein the overlay is 10 to 25 microns in thickness.

* * * * *